United States Patent
Lee et al.

(10) Patent No.: US 11,225,241 B2
(45) Date of Patent: Jan. 18, 2022

(54) METHOD FOR PROVIDING ENGINE OIL USAGE INFORMATION OF HYBRID ELECTRIC VEHICLE

(71) Applicants: Hyundai Motor Company, Seoul (KR); Kia Motors Corporation, Seoul (KR)

(72) Inventors: Yong Hoon Lee, Incheon (KR); Jee Wook Huh, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 16/700,108

(22) Filed: Dec. 2, 2019

(65) Prior Publication Data
US 2020/0398817 A1  Dec. 24, 2020

(30) Foreign Application Priority Data
Jun. 18, 2019 (KR) .......................... 10-2019-0071936

(51) Int. Cl.
*B60W 20/15* (2016.01)
*B60W 20/50* (2016.01)

(52) U.S. Cl.
CPC ............ *B60W 20/15* (2016.01); *B60W 20/50* (2013.01)

(58) Field of Classification Search
CPC ................................................. F01M 2011/14
See application file for complete search history.

(56) References Cited

U.S. PATENT DOCUMENTS

| | | | | |
|---|---|---|---|---|
| 4,677,847 A * | 7/1987 | Sawatari | ............ | G01N 33/2888 73/114.55 |
| 5,382,942 A * | 1/1995 | Raffa | ..................... | F01M 11/10 340/438 |
| 2004/0093150 A1* | 5/2004 | Arai | ........................ | F01M 11/10 701/104 |
| 2012/0119897 A1* | 5/2012 | Oh | ........................ | F16H 57/0405 340/457.4 |
| 2012/0209460 A1* | 8/2012 | Jacques | .................. | F01M 11/10 701/22 |
| 2013/0131912 A1* | 5/2013 | Chen | ..................... | G07C 5/0825 701/29.5 |
| 2013/0268182 A1* | 10/2013 | Treharne | ............... | B60W 20/18 701/113 |
| 2015/0338386 A1* | 11/2015 | Chapman, III | .... | G01N 33/2888 702/50 |

(Continued)

*Primary Examiner* — Jeff A Burke
*Assistant Examiner* — Madison B Emmett
(74) *Attorney, Agent, or Firm* — Morgan, Lewis & Bockius LLP

(57) ABSTRACT

A method for providing the engine oil usage information may include determining, by a controller, a current engine driving state out of a plurality of predetermined driving states of an engine of the hybrid electric vehicle from driving information, determining, by the controller, a real-time cumulative distance value corresponding to the determined current engine driving state, updating, by the controller, an oil usage distance using the real-time cumulative distance value, determining, by the controller, an engine oil change time by comparing the updated oil usage distance with a predetermined engine oil change distance, and informing, by the controller, information related to the determined engine oil change time through a notification unit.

17 Claims, 2 Drawing Sheets

(56) References Cited

U.S. PATENT DOCUMENTS

| | | | |
|---|---|---|---|
| 2016/0061805 A1* | 3/2016 | Prabhu | G01N 33/2817 |
| | | | 73/114.55 |
| 2016/0116392 A1* | 4/2016 | Carpenter | B01D 35/143 |
| | | | 702/34 |
| 2018/0202333 A1* | 7/2018 | Sworski | G01F 23/00 |
| 2018/0229744 A1* | 8/2018 | Manzari | B61L 15/0027 |

* cited by examiner

METHOD FOR PROVIDING ENGINE OIL USAGE INFORMATION OF HYBRID ELECTRIC VEHICLE

CROSS-REFERENCE TO RELATED APPLICATION

The present application claims priority to Korean Patent Application No. 10-2019-0071936 filed on Jun. 18, 2019, the entire contents of which is incorporated herein for all purposes by this reference.

BACKGROUND OF THE INVENTION

Field of the Invention

The present invention relates to a method for providing engine oil usage information related to a hybrid electric vehicle. More particularly, it relates to a method which may acquire accurate usage information related to engine oil, determine an accurate engine oil change time and then inform a driver of the determined accurate engine oil change time, in a hybrid electric vehicle using an engine and a different kind of power device, such as a motor.

Description of Related Art

In general, to reduce friction and wear of respective parts of an engine and to improve mechanical efficiency, a lubrication device which supplies and circulates engine oil is provided in a vehicle.

Engine oil plays important roles in protecting mechanical elements in the engine, and performs various functions, such as lubricating, sealing, cooling, cleaning and anti-rust functions, in major portions of the engine, such as a cylinder, a piston, a bearing, etc.

To exhibit sufficient engine performance, properties of the engine oil used in the engine are important and, above all, the engine may maintain constant performance only when the engine oil is changed at a reasonable time.

If the engine oil is not changed at a reasonable time, lowering of engine output power and increase in engine noise and vibration may occur, and in severe cases, a piston may stick to a cylinder wall and thus cause fatal damage to the engine.

Therefore, a system for determining that engine oil reaches a change time when the millage of a vehicle reaches a predetermined distance and then informing a driver of the engine oil change time is provided in vehicles now.

Even in a hybrid electric vehicle using an engine and another power device as driving sources, and more particularly, in a hybrid electric vehicle (HEV) driven using an engine and a motor as driving sources, engine oil is used and thus it is necessary to inform a driver of an accurate engine oil change time.

In general, hybrid electric vehicles are vehicles driven using two or more different kinds of driving sources (power devices), and mean vehicles which are driven using an engine to generate driving power through combustion of fuel and a motor to generate driving power using electrical energy of a battery.

However, in hybrid electric vehicles (HEV/PHEV), an EV mode in which a hybrid electric vehicle is driven only using a motor not by driving an engine is executed, and thus a cumulative time to drive the engine is short, as compared to a general combustion engine vehicle using an engine alone.

Here, the general combustion engine vehicle refers to an internal combustion engine (ICE) engine vehicle which is provided with an engine alone without other driving sources and is thus driven using only power of the engine.

Conventionally, the engine oil change time of the hybrid electric vehicle is determined by the same method as the general combustion engine vehicle, and thereby, engine oil having no performance problem may be unnecessarily changed.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method which may acquire accurate usage information related to engine oil, determine an accurate engine oil change time and then inform a driver of the determined accurate engine oil change time, in a hybrid electric vehicle.

Various aspects of the present invention are directed to providing a method for providing engine oil usage information related to a hybrid electric vehicle, including determining, by a controller of the hybrid electric vehicle, a current engine driving state out of a plurality of predetermined driving states of an engine of the hybrid electric vehicle from driving information detected by a driving information detection unit, determining, by the controller, a real-time cumulative distance value corresponding to the determined current engine driving state out of the driving states of the engine, updating, by the controller, an oil usage distance using the real-time cumulative distance value corresponding to the current engine driving state, determining, by the controller, an engine oil change time by comparing the updated oil usage distance with a predetermined engine oil change distance, and informing, by the controller, information related to the determined engine oil change time through a notification unit.

Other aspects and exemplary embodiments of the present invention are discussed infra.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description of the embodiments, it will be understood that, when a part "includes" an element, the part does not exclude presence of other elements but may further include one or more other elements unless stated otherwise.

The present invention relates to a method which may acquire accurate usage information related to engine oil, determine an accurate engine oil change time and then inform a driver of the determined accurate engine oil change time, in a hybrid electric vehicle using different kinds of power devices, more particularly, a hybrid electric vehicle using an engine and a motor.

Figure 1:
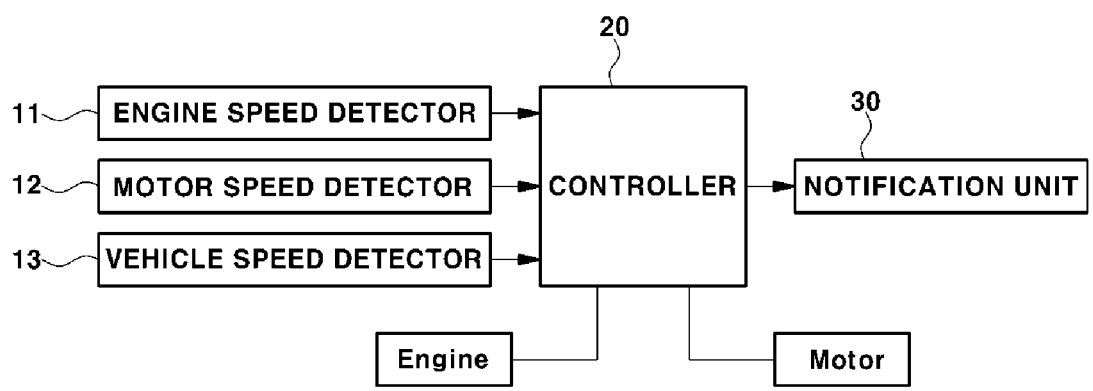
FIG. 1 is a block diagram illustrating the configuration of a system for providing engine oil usage information in accordance with various aspects of the present invention.
Figure 2:
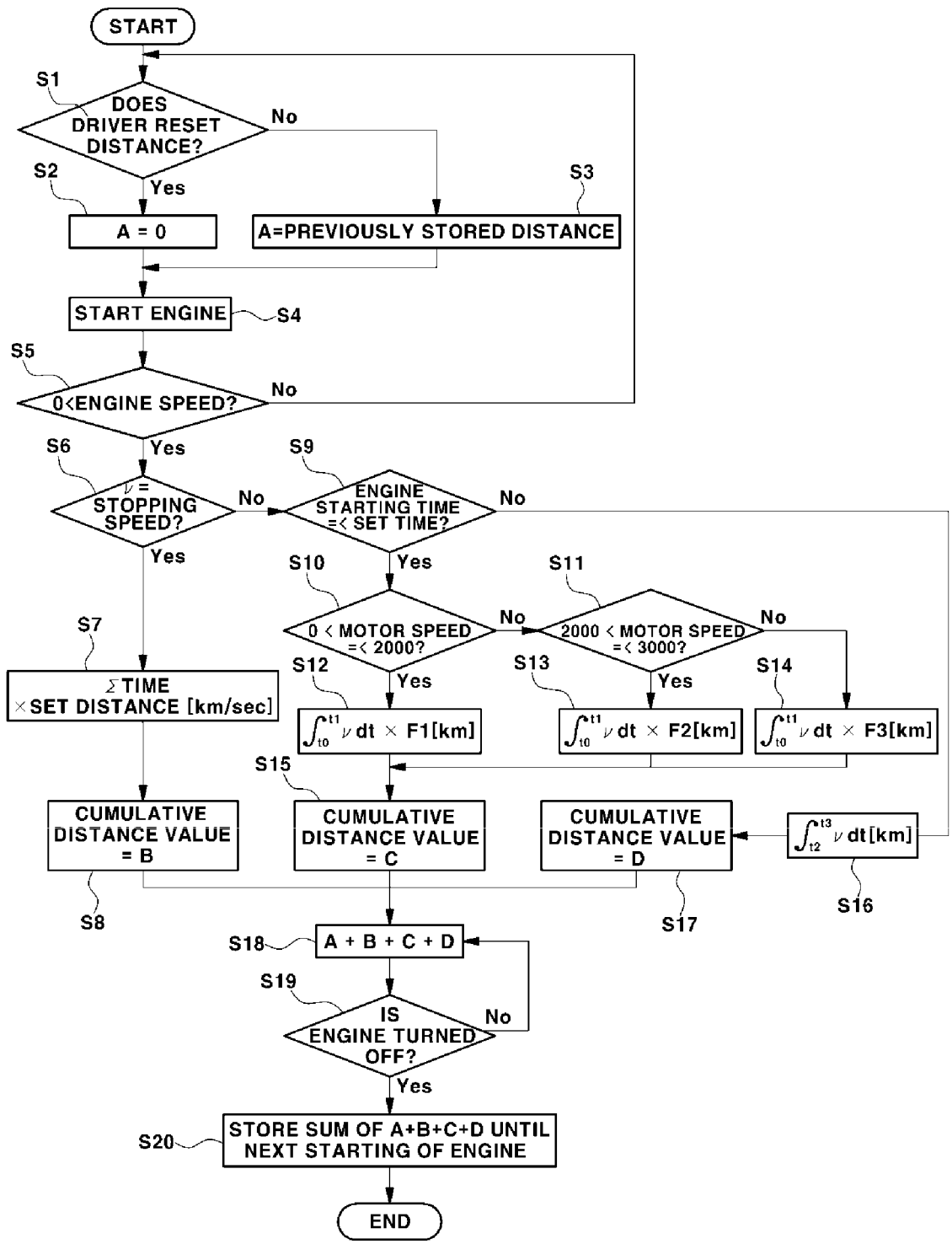
FIG. 2 is a flowchart representing a method for providing engine oil usage information in accordance with an exemplary embodiment of the present invention.

FIG. 1 is a block diagram illustrating the configuration of a system for providing engine oil usage information in accordance with various aspects of the present invention, and FIG. 2 is a flowchart representing a method for providing engine oil usage information in accordance with an exemplary embodiment of the present invention.

In an exemplary embodiment of the present invention, a controller 20 in a hybrid electric vehicle acquires usage information related to engine oil using driving information collected from the vehicle after an engine of the vehicle is started, and then determines an engine oil change time from the acquired engine oil usage information.

During such a process, the controller 20 determines a current driving state of the engine from the driving information collected from the vehicle, and determines a real-time cumulative distance value corresponding to the driving state of the engine.

Furthermore, the controller 20 determines an oil usage distance to determine the engine oil change time by adding the determined real-time cumulative distance value to a distance value A stored when the engine is previously turned off.

Thereafter, the controller 20 compares the oil usage distance with a predetermined engine oil change distance, and informs that now is a time to change the engine oil through a notification unit 30 in the vehicle, when the oil usage distance reaches the engine oil change distance.

Here, the notification unit 30 may be a warning lamp or a display in a cluster, and the controller 20 may operate the notification unit 30 to inform of the oil usage distance or to display a message informing that now is a time to change the engine oil.

In an exemplary embodiment of the present invention, the engine oil change distance may be arbitrarily set by the driver, and more particularly, when the driver sets a desired engine oil change distance on a consumable management mode screen of vehicle diagnosis and management software which is displayed through a display of the vehicle, the engine oil change distance set by the driver may be stored in the controller 20 and be used.

Furthermore, the driver may switch an engine oil change time notification function on or off on the consumable management mode screen provided by the vehicle diagnosis and management software.

Furthermore, driving states of the engine may be divided into an idle state, a starting state and a load driving state, and these divided driving states of the engine may be determined by the controller 20 using information collected from the vehicle.

Here, the controller 20 may determine the driving state of the engine as one of the idle state, the starting state and the load driving state using an engine speed (RPM) and a vehicle speed detected by a driving information detection unit as the driving information collected from the vehicle.

Furthermore, in an exemplary embodiment of the present invention, a motor speed (RPM) may be used as driving information to determine the cumulative distance value and the oil usage distance.

That is, in an exemplary embodiment of the present invention, among the engine driving states, the starting state may be subdivided into a plurality of starting states, and the motor speed (RPM) is used to determine one of the subdivided starting states.

In more detail, the controller 20 may set the subdivided starting states based on engine load states according to a motor speed (RPM) at a point in time in which the engine is started, and use the motor speed (RPM) to determine one of the subdivided starting states.

In an exemplary embodiment of the present invention, when the current engine driving state is determined as one of the subdivided starting states, a cumulative distance value during the determined subdivided starting state may be determined by applying a load factor value F1, F2 or F3 corresponding to the determined subdivided starting state.

Here, the motor means a driving motor corresponding to another driving source (power device) of a hybrid electric vehicle except for an engine, and the motor speed (RPM) means of RPM of the driving motor (i.e., the power device).

Furthermore, the driving information detection unit may include an engine speed detector 11 to detect the engine speed (RPM) and a vehicle speed detector 13 to detect the speed (km/hr) of the vehicle, and further include a motor speed detector 12 to detect the motor speed (RPM).

Among the engine driving states, the idle state means that the engine is driven in an idle state under a condition that the vehicle is stopped after starting of the engine, and the real-time cumulative distance value is determined by accumulating a predetermined distance during a time of the idle state.

In the hybrid electric vehicle, the controller 20 may determine from the engine speed (RPM) and the vehicle speed that the engine is driven in the idle state, and a situation in which a catalyst is heated, the engine is warmed up, a full automatic temperature control (FATC) system for heating is turned on or idle charging is performed after starting of the engine, may be determined as the idle state of the engine during stoppage of the vehicle.

In an exemplary embodiment of the present invention, the controller 20 may be configured to determine the driving state of the engine as the idle state, when the current engine speed (RPM) detected by the engine speed detector 11 is higher than 0 RPM but the current vehicle speed (km/hr)

detected by the vehicle speed detector 13 is a stopping speed corresponding to a predetermined value or a predetermined range (for example, if vehicle speed=0 km/hr).

If the engine is driven in the idle state, accordingly, the vehicle is stopped, but the controller 20 determines the real-time cumulative distance value, in which engine oil is used, by accumulating a set distance corresponding to a driving time of the engine in the idle state.

Here, the set distance is a distance per unit time which has a predetermined value, and may be set as a value of km per second, for example, be 0.1 km/sec.

Referring to FIG. 2, when engine oil of the vehicle is changed, a driver may reset the oil usage distance (Operation S1), and the controller 20 may recognize the current oil usage distance A before starting of the engine as 0 km (Operation S2).

Furthermore, under a condition that the determined cumulative distance value is continuously summed and stored in the controller 20 until turning-off of the engine in the previous driving of the vehicle, when the engine is turned off without reset of the oil usage distance, the oil usage distance (the previously stored distance) becomes the current oil usage distance A (Operation S3).

Before the driver resets the oil usage distance to 0 km, a distance which is finally determined and stored when the engine is previously turned off, i.e., the previously stored distance without reset, serves as the current oil usage distance A before starting of the engine.

Thereafter, when the engine speed (RPM) is higher than 0 RPM but the vehicle speed is the predetermined stopping speed (for example, 0 km/hr) (Operations S4, S5 and S6), the controller 20 determines that the engine is driven in the idle state, and determines a real-time cumulative distance value B by continuously adding the set distance (km/sec) during a time for which the engine is driven in the idle state during stoppage of the vehicle (Operations S7 and S8).

Here, the real-time cumulative distance value B in the idle state of the engine may be determined by multiplying a cumulative time of the idle state of the engine during stoppage of the vehicle by the set distance.

For example, if the set distance is a distance value (km) per unit time (sec), e.g., 0.1 km/sec, the real-time cumulative distance value B in the idle state of the engine may be determined as 'Σtime [sec]×0.1 [km/sec]'.

Here, 'Σtime' is the cumulative time (sec) for which the engine is driven in the idle state, 0.1 is the set distance which is a distance value (km) per unit time (sec), and in the exemplary embodiment of the present invention, a distance of 0.1 km is added per 1 second in the idle state of the engine.

In an exemplary embodiment of the present invention, among the driving states of the engine, the starting state means a state in which the engine is turned on, and, to convert the EV mode in which the hybrid electric vehicle is driven only using the motor, to the HEV mode, the engine may be in the starting state.

In an exemplary embodiment of the present invention, the controller 20 may differentially determine the real-time cumulative distance value using the load factor values F1, F2 and F3 which depend on the motor speeds (RPM) detected by the motor speed detector 12 during a time of the starting state.

Since an engine load is varied according to the motor speed (RPM) at a point in time in which the engine is started, the cumulative distance value is differentially determined using the load factor value F1, F2 or F3 corresponding to the motor speed (RPM).

Basically, the cumulative distance value (km) of the present invention may be determined as a value acquired by multiplying a value, acquired by integrating a vehicle speed (km/hr) during the time (hr) of the starting state, by the load factor value F1, F2 or F3 corresponding to the motor speed (RPM).

Accordingly, in an exemplary embodiment of the present invention, when the engine driving state is the starting state, the engine load is varied according to the motor speed, and thus, the load factor value depending on the motor speed is applied to determine the cumulative distance value.

For the present purpose, in an exemplary embodiment of the present invention, load factor values depending on respective motor speeds are stored in advance in the controller 20 as setup information, and a load factor value is determined from the motor speed detected by the controller 20 during starting of the engine and is used to determine the cumulative distance value.

Furthermore, the controller 20 in accordance with various aspects of the present invention may be configured to determine that the engine is in the starting state for a predetermined time period (for example, 1 sec) from a point in time in which the engine is turned on by starting the engine in the off state.

Referring to FIG. 2, the controller 20 determines that the driving state of the engine is the starting state, when the vehicle speed is not the stopping speed (for example, the vehicle speed is not 0 km/hr) in Operation S6 and until the set time elapses from starting of the engine (after turning-on of the engine) in Operation S9.

The controller 20 determines that the engine is in the starting state until the set time elapses from starting of the engine (turning-on of the engine), and determines the cumulative distance value using the load factor value F1, F2 or F3 corresponding to the current motor speed in the starting state of the engine.

A load factor may indicate a magnitude of engine load according to the motor speed, and the controller 20 may determine the load factor value F1, F2 or F3 indicating the magnitude of engine load at a point in time in which the engine is started from the current motor speed (RPM) detected by the motor speed detector 12.

In an exemplary embodiment of the present invention, as the motor speed is increased, i.e., as the motor RPM is increased, the load factor value may be set to a higher value.

In an exemplary embodiment of the present invention, when the engine is started, an engine load area may be divided into a plurality of areas according to the motor speed, and, for example, three areas divided according to the motor speed may be set.

That is, if the motor speed is higher than 0 RPM and does not exceed a first predetermined speed, the engine load area may be set to a first area, if the motor speed is greater than the first predetermined speed and does not exceed a second predetermined speed, the engine load area may be set to a second area, and, if the motor speed is greater than the second predetermined speed, the engine load area may be set to a third area.

Here, the second predetermined speed is greater than the first predetermined speed.

In an exemplary embodiment of the present invention, the first predetermined speed may be 2000 RPM and the second predetermined speed may be 3000 RPM, as exemplarily shown in FIG. 2.

If three areas are set according to the motor speed, as described above, the third area corresponding to an area having the maximum engine load magnitude may be set to have the greatest load factor value F3, the second area corresponding to an area having a median engine load magnitude may be set to have a median load factor value F2, and the first area corresponding to an area having the minimum engine load magnitude may be set to have the smallest load factor value F1 (i.e., F1<F2<F3).

Accordingly, as the motor speed at the point in time in which the engine is started is increased, it is determined that higher load is applied to the engine, and a longer distance is accumulated in case that the engine is started when the motor speed is high, as compared to a general driving situation.

In the exemplary embodiment of the present invention, the first area is an area having the highest engine efficiency and the load factor value F1 of the first area may be set to 1, and the second area is an area in which engine efficiency starts to be decreased from a point having the highest engine efficiency and the load factor value F2 of the second area may be set to 1.5.

Furthermore, the third area is an area having relatively poor engine efficiency and the load factor value F3 of the third area may be set to 2.

Numerical values, such as the number of the areas divided according to the motor speed, the first predetermined speed and the second predetermined speed to divide the areas, the load factor values F1, F2 and F3 of the respective areas, are only exemplary, do not limit the present invention, and may thus be changed and modified according to specifications or conditions of the vehicle.

Consequently, the real-time cumulative distance value when the engine is started may be determined using the load factor value determined according to the motor speed, and Equations 1, 2 and 3 below will be respectively used to determine cumulative distance values of the first area, the second area and the third area in accordance with the exemplary embodiment of the present invention.

$$\text{Cumulative distance value of the first area} = \int_{t0}^{t1} vdt \times F1 \quad \text{[Equation 1]}$$

$$\text{Cumulative distance value of the second area} = \int_{t0}^{t1} vdt \times F2 \quad \text{[Equation 2]}$$

$$\text{Cumulative distance value of the third area} = \int_{t0}^{t1} vdt \times F3 \quad \text{[Equation 3]}$$

Here, v indicates a vehicle speed, F1, F2 and F3 indicate load factor values of respective areas, t0 indicates a point in time in which the engine is turned on, t1 indicates a point in time in which the set time elapses from turning-on of the engine, and a time from t0 to t1 is an engine starting time, i.e., a time for which the engine is in starting state.

Referring to FIG. 2, when the engine speed is higher than 0 rpm and the vehicle speed is not the stopping speed (for example, 0 km/hr) in Operations S5 and S6, the controller 20 determines that the engine is in the starting state until the set time elapses from starting of the engine (turning-on of the engine) in Operation S9, determines the load factor value F1, F2 or F3 corresponding to the current motor speed by comparing the current motor speed with the first predetermined speed (2000 RPM) or the second predetermined speed (3000 RPM) in Operation S10 or S11, and determines the cumulative distance value at the current vehicle speed during the engine starting time using the determined load factor value F1, F2 and F3 in Operation S12, S13 or S14.

In FIG. 2, the cumulative distance value during the starting state of the engine is indicated by C.

After the set time elapses from starting of the engine (turning-on of the engine) in Operation S9, the controller 20 determines that the driving state of the engine is the load driving state to drive the vehicle.

From a point in time in which the set time (for example, 1 sec) elapses from starting of the engine, the driving state of the engine becomes the load driving state in which driving torque to drive the vehicle is output, and the set time may be determined in consideration of a time at which lock-up of an engine clutch is completed in a transmission mounted electric device (TMED)-type hybrid system.

That is, a point in time in which lock-up of the engine clutch is completed is determined as the point in time in which the set time elapses, and thus, after the set time elapses, the driving state of the engine is regarded as the load driving state.

In an exemplary embodiment of the present invention, the load driving state means a state in which engine power is used to drive the vehicle, and, for example, means the driving state of the engine in the HEV mode in which the hybrid electric vehicle is driven using a combination of engine power and motor power.

If the driving state of the engine is determined as the load driving state, as described above, the real-time cumulative distance value is determined using the vehicle speed during an engine driving time (a time from t2 to t3), and, in the instant case, the cumulative distance value will be determined by Equation 4 below (Operations S16 and S17).

$$\text{Cumulative distance value in load driving state} = \int_{t2}^{t3} vdt \quad \text{[Equation 4]}$$

Here, v indicates a vehicle speed, t2 indicates a point in time in which load driving is started, and t3 indicates a point in time in which load driving is ended.

Referring to FIG. 2, Operation S16 represents that the driving state of the engine is the load driving state, and, if the driving state of the engine is the load driving state, the real-time cumulative distance value is determined by integrating the vehicle speed over time, as stated in Equation 4.

In FIG. 2, the cumulative distance value in the load driving state is indicated by D.

Accordingly, a new oil usage distance is determined by summing the previous oil usage distance A before starting of the engine and the cumulative distance values B, C and D determined according to the driving states of the engine after current starting of the engine, until the engine is turned off and is simultaneously stored so that the previous oil usage distance A is updated in real time (Operations S18, S19 and S20), and such a determined and stored oil usage distance is used as the previous oil usage distance A before next starting of the engine.

The controller 20 updates the previous oil usage distance with a value acquired by adding the real-time cumulative distance values corresponding to the current engine driving states to the previous oil usage distance.

Furthermore, the controller 20 compares the real-time updated oil usage distance with the engine oil change distance, and operates the notification unit 30 to inform that now is a time to change the engine oil, when the oil usage distance reaches the engine oil change distance.

Here, the engine oil usage information includes information regarding use of the engine oil, such as the current oil usage distance, whether or not now is a time to change the engine oil, etc., and the controller 20 may be configured to inform of the oil usage distance or to inform that now is a time to change the engine oil through the notification unit 30.

Therefore, in accordance with various aspects of the present invention, in acquisition of use information related to engine oil and determination of an engine oil change time, differently from conventional general combustion engine vehicles which use only a driving distance determined from a vehicle speed, other factors, such as an engine speed, etc., are additionally used, and thereby, engine usage and driving characteristics in the hybrid electric vehicle may be reflected and accurate usage information and change time information related to the engine oil may be acquired.

Furthermore, accurate information regarding use of the engine oil may be provided, and thus, unnecessary change of the engine oil may be minimized, engine oil change costs may be reduced and productivity and reliability of the hybrid electric vehicle may be improved.

Furthermore, the method in accordance with various aspects of the present invention is not limited to a hybrid electric vehicle which is driven using both an engine and a motor, and may determine and provide an accurate engine oil change time of all vehicles which use both an engine and a different kind of driving source (power device).

As is apparent from the above description, in a method for providing engine oil usage information related to a hybrid electric vehicle in accordance with various aspects of the present invention, engine usage and driving characteristics in the hybrid electric vehicle using both an engine and a different kind of power device may be reflected in acquisition of usage information related to engine oil and determination of an engine oil change time, and Accordingly, accurate usage information and change time information related to the engine oil may be acquired, and unnecessary change of the engine oil may be minimized.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of providing engine oil usage information related to a hybrid electric vehicle, the method comprising:
   determining, by a controller of the hybrid electric vehicle, a current engine driving state out of a plurality of predetermined driving states of an engine of the hybrid electric vehicle from driving information detected by a driving information detection unit connected to the controller;
   determining, by the controller, a real-time cumulative distance value corresponding to the determined current engine driving state out of the predetermined driving states of the engine;
   updating, by the controller, an oil usage distance using the real-time cumulative distance value corresponding to the determined current engine driving state;
   determining, by the controller, an engine oil change time by comparing the updated oil usage distance with a predetermined engine oil change distance; and
   informing, by the controller, information related to the determined engine oil change time through a notification unit connected to the controller,
   wherein the predetermined driving states of the engine include an idle state, a starting state, and a load driving state using engine power to drive the hybrid electric vehicle,
   wherein, in a response that the determined current engine driving state is the idle state, the controller is configured to determine the real-time cumulative distance value by multiplying a cumulative time for which the engine is driven in the idle state during stoppage of the hybrid electric vehicle with a predetermined distance, and
   wherein the predetermined distance is a distance value per unit time, predetermined by the controller.

2. The method of claim 1, wherein the driving information to determine the current engine driving state includes an engine speed and a vehicle speed.

3. The method of claim 1,
   wherein, until a predetermined time elapses from starting of the engine under a condition that an engine speed is higher than 0 revolutions per minute (RPM) and a vehicle speed is not equal to a stopping speed, the controller is configured to determine the current engine driving state as the starting state.

4. The method of claim 1, wherein, after a predetermined time elapses from starting of the engine under a condition that an engine speed is higher than 0 RPM and a vehicle speed is not equal to a stopping speed, the controller is configured to determine the current engine driving state as the load driving state.

5. The method of claim 4, wherein, in a response that the current engine driving state is determined as the load driving state, the controller is configured to determine the real-time cumulative distance value by integrating the vehicle speed during a time of the load driving state.

6. The method of claim 1, wherein the controller is configured to determine a new oil usage distance by adding real-time cumulative distance values determined in respective engine driving states during a first traveling period of the hybrid electric vehicle where the hybrid electric vehicle is driven after a first start of the engine to the oil usage distance obtained before the first start of the engine, wherein the real-time cumulative distance values are added to the oil usage distance after the first traveling period but before a start of a second traveling period, the first traveling period being followed by the second traveling period.

7. The method of claim 6, wherein, upon determining that the oil usage distance is reset, the controller is configured to reset the oil usage distance before starting of the engine to 0 km.

8. A method of providing engine oil usage information related to a hybrid electric vehicle, the method comprising:
   determining, by a controller of the hybrid electric vehicle, a current engine driving state out of a plurality of predetermined driving states of an engine of the hybrid electric vehicle from driving information detected by a driving information detection unit connected to the controller;

determining, by the controller, a real-time cumulative distance value corresponding to the determined current engine driving state out of the predetermined driving states of the engine;

updating, by the controller, an oil usage distance using the real-time cumulative distance value corresponding to the determined current engine driving state;

determining, by the controller, an engine oil change time by comparing the updated oil usage distance with a predetermined engine oil change distance; and informing, by the controller, information related to the determined engine oil change time through a notification unit connected to the controller, wherein the predetermined driving states of the engine include an idle state, a starting state, and a load driving state using engine power to drive the hybrid electric vehicle, and wherein the starting state is subdivided into a plurality of starting states based on an engine load state according to a motor speed at a point in time in which the engine is started as the driving information, and the subdivided starting states are set by the controller.

9. The method of claim 8, wherein a plurality of engine load areas divided according to the motor speed at the point in time in which the engine is started are predetermined by the controller, and load factor values corresponding to the plurality of engine load areas are predetermined by the controller, and wherein the controller, in a response that the determined current engine driving state is the starting state, is configured to:

determine an engine load area of the plurality of engine load areas according to the motor speed at the point in time in which the engine is started; and determine the real-time cumulative distance value during the starting state using a load factor value corresponding to the engine load area of plurality of engine load areas and a current vehicle speed.

10. The method of claim 9, wherein the controller is configured to determine the real-time cumulative distance value by multiplying a value, acquired by integrating the current vehicle speed during a time of the starting state, by the load factor value.

11. The method of claim 10, wherein, as the motor speed in the engine load area at the point in time in which the engine is started is increased, the load factor value corresponding to the engine load area, predetermined by the controller, is increased.

12. A hybrid electric vehicle comprising:

an engine and a motor selectively coupled to the engine;

a driving information detection unit configured to detect driving information of the hybrid electric vehicle;

a notification unit; and a controller connected to the driving information detection unit and the notification unit and configured of:

determining a current engine driving state out of a plurality of predetermined driving states of the engine from the driving information detected by the driving information detection unit;

determining a real-time cumulative distance value corresponding to the determined current engine driving state out of the predetermined driving states of the engine;

updating an oil usage distance using the real-time cumulative distance value corresponding to the determined current engine driving state;

determining an engine oil change time by comparing the updated oil usage distance with a predetermined engine oil change distance; and informing information related to the determined engine oil change time through the notification unit, wherein the predetermined driving states of the engine include an idle state, a starting state, and a load driving state using engine power to drive the hybrid electric vehicle, and wherein, in a response that the determined current engine driving state is the idle state, the controller is configured to determine the real-time cumulative distance value by multiplying a cumulative time for which the engine is driven in the idle state during stoppage of the hybrid electric vehicle with a predetermined distance, and wherein the predetermined distance is a distance value per unit time, predetermined by the controller.

13. The hybrid electric vehicle of claim 12, wherein the driving information to determine the current engine driving state includes an engine speed and a vehicle speed.

14. The hybrid electric vehicle of claim 12, wherein, until a predetermined time elapses from starting of the engine under a condition that an engine speed is higher than 0 revolutions per minute (RPM) and a vehicle speed is not equal to a stopping speed, the controller is configured to determine the current engine driving state as the starting state.

15. The hybrid electric vehicle of claim 12, wherein the starting state is subdivided into a plurality of starting states based on an engine load state according to a motor speed at a point in time in which the engine is started as the driving information, and the subdivided starting states are set by the controller.

16. The hybrid electric vehicle of claim 12, wherein, after a predetermined time elapses from starting of the engine under a condition that an engine speed is higher than 0 RPM and a vehicle speed is not equal to a stopping speed, the controller is configured to determine the current engine driving state as the load driving state.

17. The hybrid electric vehicle of claim 12, wherein the controller is configured to determine a new oil usage distance by adding real-time cumulative distance values determined in respective engine driving states during a first traveling period of the hybrid electric vehicle where the hybrid electric vehicle is driven after a first start of the engine to the oil usage distance obtained before the first start of the engine, wherein the real-time cumulative distance values are added to the oil usage distance after the first traveling period but before a start of a second traveling period, the first traveling period followed by the second traveling period.

* * * * *